UNITED STATES PATENT OFFICE 2,494,041

DERIVATIVES OBTAINED BY REACTING GELATIN AND FUROYL HALIDES

Gordon F. Frame, Rochester, N. Y., assignor to Eastman Kodak Company, Rochester, N. Y., a corporation of New Jersey No Drawing. Application August 13, 1947, Serial No. 768,472

6 Claims. (Cl. 260—117)

This invention relates to gelatin derivatives obtained by reacting gelatin with furoyl chloride or other halide.

It is often desirable to alter the properties of gelatin by lowering the isoelectric point or by making it coagulable at the isoelectric point. By thus altering these characteristics, products are obtained which are useful in certain connections where the original gelatins themselves would not be suitable.

One object of my invention is to prepare furoyl chloride derivatives of gelatin. Another object of my invention is to provide a method by which the isoelectric point of gelatins can be lowered. A further object is to provide a method of making gelatin derivatives which will coagulate at the isoelectric point. Other objects of my invention will appear herein.

I have found that the isoelectric point of gelatins may be lowered and the gelatins may be made coagulable by reacting upon gelatins with furoyl chloride. This is accomplished by thoroughly mixing the gelatin while in solution with the furoyl chloride under alkaline conditions. Ordinarily, the process in accordance with my invention may be carried out in aqueous solution although non-aqueous solvents, such as formamide may be employed for this purpose. The reaction may be speeded up by the use of an elevated temperature and, therefore, it is preferred in actual operations that the temperature be raised, such as above room temperature up to 110° F. The reaction in accordance with my invention, however, may be carried out at any temperature from room temperature up to that at which the gelatin experiences breakdown due to high temperature. If breakdown is not objectionable, great care is unnecessary.

I prefer to carry out the reaction of the furoyl chloride upon the gelatins at an alkaline pH, such as of 8.5 to 12, although the reaction may take place but less effectively at other pH values.

Any of the various gelatins may be employed as the starting material in the method in accordance with my invention. Gelatin may be employed of either a pure, crude, or ashed variety, hydrolyzed gelatin, or gelatin having a substantial degree of polymerization, such as calfskin gelatin as prepared by careful methods. However, other gelatins, such as bone gelatin, pig gelatin, glue or degraded gelatin may be employed. It is preferred, however, if the gelatin derivative is to be employed in the fine arts, such as for photographic purposes, that a refined gelatin of a high degree of polymerization be used as the starting material. The pH may be imparted by aqueous sodium hydroxide or, if desired, other bases than alkali metal hydroxide may be employed, such as ammonia, methylamine, tetramethyl ammonium hydroxide or, as a matter of fact, any alkaline material which will impart the desired pH and does not have a detrimental effect on the gelatin employed. This includes substantially all of the water-soluble bases known.

The reaction is carried out by first dissolving the gelatin in a solvent material and then thoroughly mixing the gelatin with furoyl chloride (either α or β) under the conditions prescribed. By this means, a product is obtained having the characteristics of peptizing silver halides which renders the product valuable in several usages. The material thus formed is compatible with gelatin and polyvinyl alcohol, both of which are well-known materials for use as carriers for silver halide emulsions.

As a general rule in the processes in accordance with our invention, the material after its preparation will be more useful for various purposes by acidifying the solution in which the gelatin derivative is found. In this way oftentimes the gelatin derivative can be used directly for the purpose desired. The reaction of furoyl chloride on gelatins has the effect of lowering their isoelectric point and of causing them to coagulate at that point. The time necessary for obtaining the gelatin derivatives in accordance with my invention depends upon the speed at which the reaction is carried out. For instance, at a temperature of 110° F. ordinarily a treatment for two hours is sufficient to give the desired product. If, however, a higher temperature is used, a time of one hour or less may be sufficient.

The products obtained in accordance with my invention have been found to be particularly useful for peptizing silver halide, as disclosed in application Serial No. 768,474, of myself and Yutzy, filed of even date. For instance, a stream of silver nitrate and a stream of sodium bromide, if slowly added to an agitated solution of gelatin derivative in accordance with our invention, causes dispersion of the silver halide grains formed, making the resulting product eminently suitable for photographic use.

The following example illustrates the preparation of furoyl gelatin in accordance with my invention.

100 parts of calfskin gelatin were dispersed in 1200 parts of water at 104° F. A pH of 9.5 was imparted to this dispersion using aqueous alkali, and there was then added thereto dropwise 7.5 parts of α-furoyl chloride in 50 parts of dry acetone accompanied by vigorous agitation. The pH was held constant by the addition of dilute alkali. After the addition was complete, the pH was lowered to 6.0; the dispersion was chilled to gel the same. The gel was then slightly washed with water and dried by means of a current of dry air. A yield of 100 parts of gelatin derivative was obtained. The isoelectric point of the gelatin derivative was below a pH of 4.5 as compared with an original isoelectric point of 4.9 for the gelatin employed as the starting material. Furthermore, it precipitated from solution as a coagulum at its isoelectric point. If desired, β-furoyl chloride may be employed for preparing gelatin derivatives in this manner. The use of other halides than the chlorides in preparing gelatin derivatives in the manner described is also within the scope of my invention.

I claim:

1. A gelatin derivative resulting from heating together in solution gelatin and the halide of a furoic acid at a pH of 8.5–12.

2. A gelatin derivative resulting from heating together in solution gelatin and α-furoyl chloride at a pH of 8.5–12.

3. A gelatin derivative resulting from heating together in solution gelatin and a β-furoyl chloride at a pH of 8.5–12.

4. A method of preparing a gelatin derivative which comprises heating a solution of gelatin with the chloride of a furoic acid at a pH of 8.5 to 12.

5. A method of preparing a gelatin derivative which comprises heating an aqueous solution of gelatin with α-furoyl chloride at a pH of 8.5 to 12.

6. A method of preparing a gelatin derivative which comprises heating an aqueous solution of gelatin with α-furoyl chloride at a pH of 9.5.

GORDON F. FRAME.

REFERENCES CITED

The following references are of record in the file of this patent:

UNITED STATES PATENTS

| Number | Name | Date |
| --- | --- | --- |
| 2,317,286 | Martin et al. | Apr. 20, 1943 |

OTHER REFERENCES

Olcott Ind. and Eng. Chem. (Jan. 1946), vol. 28, pp. 104 to 106.